United States Patent
Pommeret et al.

(10) Patent No.: US 7,040,787 B2
(45) Date of Patent: May 9, 2006

(54) SIGNALING DEVICE AND A MOTOR VEHICLE BODYWORK PART FITTED WITH SUCH A DEVICE

(75) Inventors: Maelig Pommeret, Lyons (FR); Fabien Delwal, Chalamont (FR)

(73) Assignee: Compagnie Plastic Omnium, Lyons (FR)

( * ) Notice: Subject to any disclaimer, the term of this patent is extended or adjusted under 35 U.S.C. 154(b) by 197 days.

(21) Appl. No.: 10/611,915

(22) Filed: Jul. 3, 2003

(65) Prior Publication Data

US 2004/0136201 A1  Jul. 15, 2004

(30) Foreign Application Priority Data

Jul. 4, 2002 (FR) .................................. 02 08392

(51) Int. Cl.
*B60Q 1/02* (2006.01)

(52) U.S. Cl. ...................... 362/496; 362/612; 362/626; 362/311; 362/518; 362/390; 296/187.03; 296/187.09; 296/187.11; 296/187.12

(58) Field of Classification Search .................. 362/31, 362/26, 511, 551, 311, 351, 608, 611, 615, 362/621, 623, 626, 495, 496, 369, 390, 516, 362/518, 520, 543; 296/187.03, 187.04, 296/187.09, 187.1, 187.11, 187.12
See application file for complete search history.

(56) References Cited

U.S. PATENT DOCUMENTS

| 5,590,945 | A | 1/1997 | Simms |
| 6,299,334 | B1 * | 10/2001 | Schwanz et al. ............. 362/511 |
| 6,315,339 | B1 * | 11/2001 | Devilliers et al. .......... 293/132 |
| 6,422,005 | B1 * | 7/2002 | Dolling et al. ................ 60/286 |
| 6,951,365 | B1 * | 10/2005 | Chase et al. ........... 296/187.03 |
| 2001/0040811 | A1 * | 11/2001 | Chase et al. ................ 362/546 |
| 2002/0085389 | A1 * | 7/2002 | Cheron et al. .............. 362/545 |
| 2004/0130182 | A1 * | 7/2004 | Bangle et al. ........... 296/180.5 |

FOREIGN PATENT DOCUMENTS

| EP | 0 945 672 A1 | 9/1999 |
| EP | 1 022 187 A2 | 7/2000 |
| EP | 1 184 619 A2 | 3/2002 |

* cited by examiner

*Primary Examiner*—Thomas M. Sember
(74) *Attorney, Agent, or Firm*—Oliff & Berridge, PLC

(57) ABSTRACT

The invention provides a signaling device for a motor vehicle, the signaling device being constituted by a skin of translucent material presenting an outside face to be seen from outside the vehicle when said device is mounted on the vehicle, and an inside face opposite the outside face. Projecting from its inside face, translucent skin has at least one rib made integrally with the skin and out of the same translucent material as the skin. The thickness of the rib is greater than the thickness of the translucent skin.

12 Claims, 3 Drawing Sheets

SIGNALING DEVICE AND A MOTOR VEHICLE BODYWORK PART FITTED WITH SUCH A DEVICE

The present invention relates to a motor vehicle signaling device and to a bodywork part suitable for supporting such a device.

BACKGROUND OF THE INVENTION

It is already known to place light-emitting devices at various locations of a motor vehicle to reveal the outline of the vehicle.

Such light-emitting devices are generally light-emitting diodes (LEDs) grouped together and enclosed in transparent housings, which are added to or incorporated in external members or which are stuck behind cabin windows.

Those devices perform their function and improve traffic safety by making the vehicle more visible at night. Nevertheless, they require means that are expensive both for manufacture and for assembly on the vehicle. They also constitute devices that can break down, and consequently they increase the cost of maintaining the vehicle.

Another drawback of such known devices is their relative fragility, which means they cannot be placed just anywhere on a vehicle.

Furthermore, they provide light-emitting surfaces that are small and limited by the number of LEDs, which constitutes a limitation both in terms of the effectiveness of the signaling provided and in terms of the decorative possibilities they offer.

In an attempt to remedy those drawbacks, proposals have been made in the prior art, and in particular in EP 1 022 187, for a signaling device, and more precisely a flashing direction-indicator device arranged on a rearview mirror, in which a portion of the casing of the mirror is constituted by a translucent part serving as a light guide. Thus, light rays coming from point light sources disposed exactly in register with the thickness of the part are diffused via the outside face of the part towards the front and the side of the vehicle. Fine ribs are formed on the inside face of the translucent part to reflect the light rays in the horizontal direction, and in particular to prevent them from being diffused downwards.

In such a device, a problem consists in that the translucent part must be capable of withstanding impacts and must also be sufficiently thick to be effective in collecting the light rays emitted by the point light sources, which requires a large amount of material, giving rise to significant weight, bulk, and cost.

OBJECTS AND SUMMARY OF THE INVENTION

The present invention seeks to propose a signaling device that is strong, that requires little material, and, in addition, that is particularly simple and inexpensive to make and use.

The invention provides a signaling device for a motor vehicle, the signaling device being constituted by a skin of translucent material presenting an outside face to be seen from outside the vehicle when said device is mounted on the vehicle, and an inside face opposite from the outside face, the translucent skin including at least one rib projecting from its inside face, the rib being made integrally with the skin and out of the same translucent material as the skin, wherein the thickness of the rib is greater than the thickness of the translucent skin.

The signaling device of the invention is thus constituted by a light guide formed by the rib(s) and by a diffuser of the light guided in this way, as formed by the outer skin of the translucent part.

By means of the invention, a translucent part is provided that presents sufficient strength even though it includes a translucent skin that is relatively fine. In addition, since the light guiding function is provided by the rib, it is only the rib that needs to be thick enough to receive all of the light coming from point light sources, which means that the skin can be thinner than the light sources.

A remarkable advantage of the invention is that the translucent part has no need to be protected against the risks of being damaged. On the contrary, because of the light guide forming rib(s), the translucent part benefits from reinforcement which enables it to perform an additional function of protecting the vehicle bodywork.

For example, the translucent part of the invention may constitute a bumper strip or a side strip for protecting a door.

It may also constitute a headlight glass, made out of a material that withstands impacts, like a protective strip or capping.

It will also be understood that because of its large extent, the translucent part of the invention diffuses the light coming from the light source over an area which is firstly much greater than that provided by the point light source, and secondly can be of arbitrary shape.

Advantageously, the rib is shaped so as to reflect light rays penetrating into the rib through one of its faces so that they go towards its outside face.

In a particular embodiment, the rib has a face opposite from the skin that is subdivided into facets in a staircase configuration. The function of these facets is to reflect light rays that penetrate into the ribs so that they go towards its outside face.

In a particular embodiment, compatible with the preceding embodiments, the device is arranged for mounting on a bodywork part. In which case, said device covers a fraction of the bodywork part and can thus serve to protect it against impacts.

Given the presence of the rib, the translucent skin may be convex over the rib, being formed by two curved flanks meeting substantially in a plane containing the face of the rib that is opposite from the skin.

In a particular embodiment, the device includes means for fixing light sources on the rib.

Thus, in the event of an impact, if the signaling device is pushed in, then the light sources which are connected to the rib move back correspondingly and are therefore not damaged by the skin being pushed in.

In an embodiment of the invention, the rib includes fixing means for co-operating with complementary means carried by a bodywork part of the vehicle.

Thus, because of these fixing means molded integrally with the rib, there is no need for additional fasteners to fix the signaling device on the vehicle. Furthermore, the relatively large thickness of the rib compared with that of the skin ensures that the device is fixed on the bodywork part in a manner that is more secure than would be the case if the fixing means were arranged on the skin.

The present invention also provides a motor vehicle bodywork part which includes, in its outer surface, a housing for receiving a signaling device as described above.

The housing is preferably recessed and presents thickness that is substantially equal to that of the edges of the translucent skin, the outline of said housing being dimensioned in such a manner as to contain the skin exactly, so that its edges lie flush with the bodywork part at the periphery of the housing.

BRIEF DESCRIPTION OF THE DRAWINGS

To make the invention easier to understand, embodiments are described below by way of non-limiting examples and with reference to the accompanying drawings, in which.

MORE DETAILED DESCRIPTION

Figure 1:
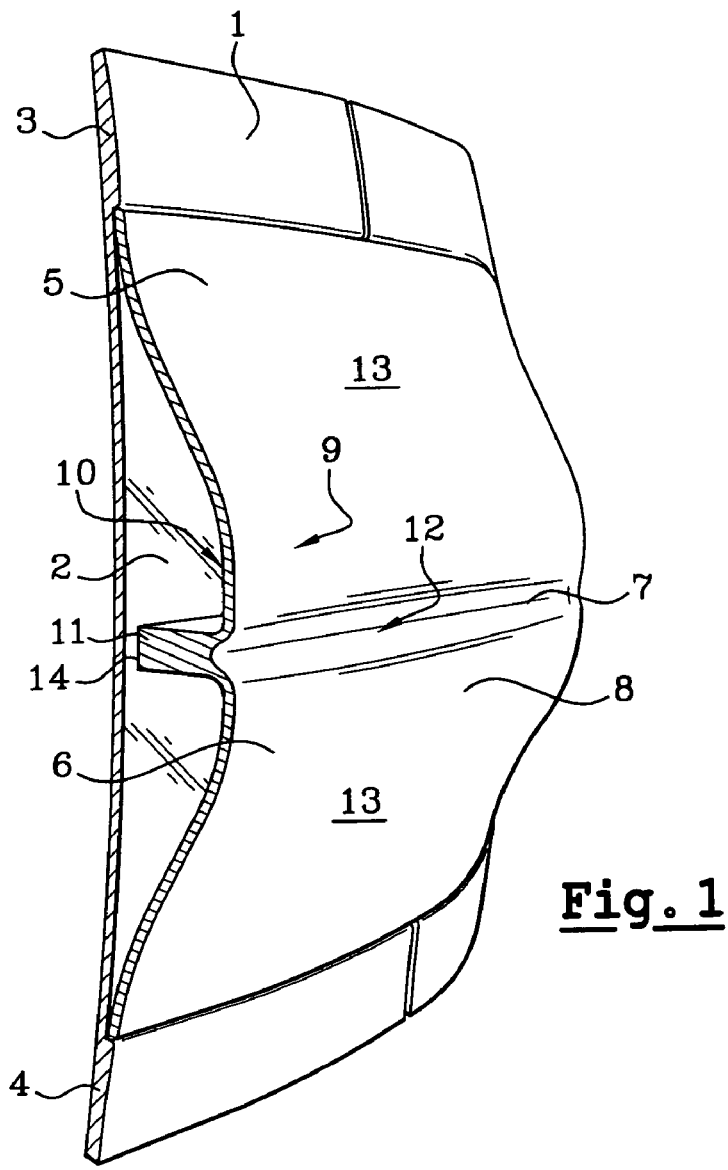
FIG. 1 is a perspective view of a signaling device constituting a first embodiment of the invention, placed on a bumper skin.

FIG. 1 shows part of a front bumper skin, or shield 1, of a motor vehicle.

The shield 1 is painted in conventional manner so as to be of the same color as the other bodywork parts of the vehicle.

In its central region, the shield 1 has a recessed housing 2 which is defined by two longitudinal strips, a top strip 3 and a bottom strip 4.

This housing 2 defined by the top and bottom strips 3 and 4 is obtained merely by reducing the thickness of the shield.

This difference in thickness is substantially equal to the thickness of the longitudinal edges 5 and 6 of a translucent capping strip 7 placed in the housing 2.

The translucent capping strip 7 comprises a skin 8 having an outside face 9 which is visible from outside the vehicle, and an inside face 10 facing towards the shield 1. The skin 8 is relatively fine, and its thickness may lie in the range 2.5 millimeters (mm) to 3 mm. A rib 11 made integrally with the skin 8 of the capping strip projects from the inside face 10 towards the shield 1. This rib 11 is also translucent, it is thicker than the skin 8, its thickness being about 5 mm, and it connects in continuous manner with the skin of the capping strip, i.e. there is no interruption of the material constituting them.

The outside face 9 of the capping strip is shaped so as to present a line of styling 12 in register with the rib, so as to mask the effect of the shrink mark that results from the presence of the rib 11.

The cross-section of the rib 11 is substantially rectangular, except for its face corresponding to the outside face of the capping strip which, as explained above, includes a setback that forms a line of styling 12. Because of the presence of the rib 11 of height that is much greater than the depth of the housing, the capping strip 7 presents a convex shape so that its central region close to the rib projects from the shield.

On either side of this central region, the capping strip comprises two curved flanks 13 of S-shaped section which are connected to the shield 1, progressively joining the bottom of the housing 2. Thus, the free edges 5 and 6 of said flanks 13 terminate in a plane containing the face 14 of the rib that is opposite from the skin of the translucent part.

Figure 2:
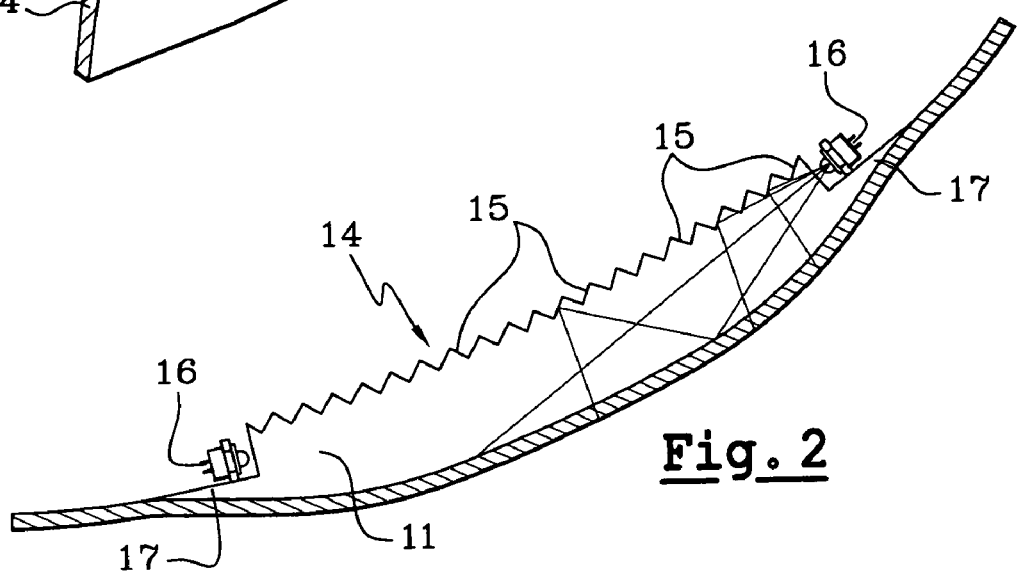
FIG. 2 is a horizontal section view of FIG. 1.

As can be seen in FIG. 2, the face 14 of the rib that is opposite from the skin 8 presents a multitude of facets 15 in a staircase configuration. These facets constitute surfaces for reflecting light rays that penetrate into the rib 11 via its ends, as shown in FIG. 2, where two point light sources 16 are shown each placed facing a corresponding end face of the rib, the light sources being secured to respective extensions 17 of said rib.

It should be observed that in order to ensure that light rays propagate over the entire length of the capping strip, even though it is curved, the rib 11 is preferably dimensioned in such a manner that its face 14 opposite from the skin is close to a chord interconnecting the two light sources 16.

However, this disposition is not essential, given that the light rays can reflect on the outside face of the skin in order to follow the curvature of the bumper.

After one or more reflections on the outside face and on one of the facets of the rib, the light rays reach the skin 8 with an angle of incidence that is close to a right angle. Light rays with such an orientation thus leave the capping strip in register with the rib, thereby producing light in the central region of the skin of the capping strip.

Conversely, the free edges 5, 6 of the two flanks of the capping strip receive very little light, firstly because they are close to the bottom of the housing, and secondly because they are close to the top and bottom strips.

Thus, the edges of the flanks of the capping strip take on a color that is very close to that of the shield.

The flanks thus constitute zones in which there is a continuous color transition between the color of the shield and that of the capping strip in register with its rib.

As already explained, the rib of the translucent part forms a light guide which conveys and uniformly distributes the light coming from the point light sources placed at the two ends of the capping strip.

However in the example described herein, the rib also performs a structural function by providing mechanical reinforcement to the capping strip, thus enabling it to constitute the first barrier against any low-energy impacts to which the bumper might be subjected.

Any shape of rib can be considered in accordance with the invention.

Figure 3:
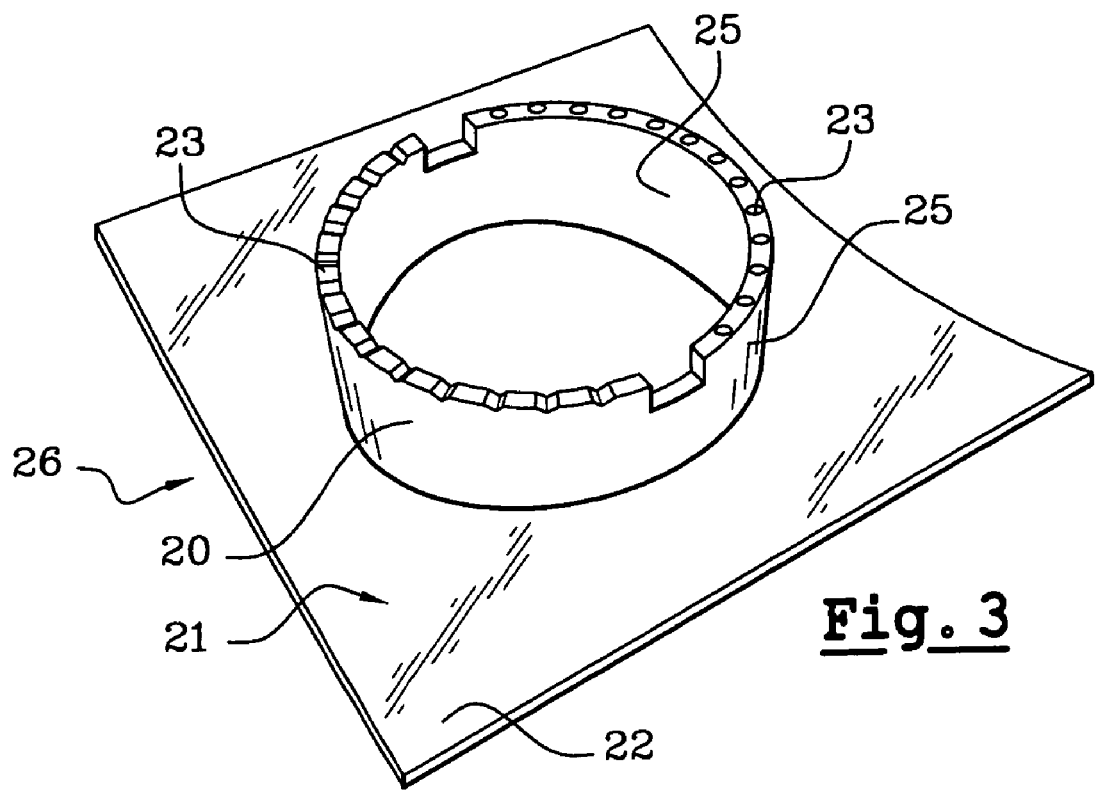
FIG. 3 is a perspective view of another signaling device of the invention.

FIG. 3 shows another example of a rib 20 projecting from the inside face 21 of a signaling device 22 in accordance with the invention.

In this example, the rib 20 is shaped as a ring, of thickness that is relatively great compared with the thickness of the skin of the device 22. It has a certain number of facets 23 disposed in a staircase configuration on one-half of its face opposite from the outside face of the signaling device. Two diametrically opposite notches 24 are provided for receiving light sources (not shown) that are directed tangentially relative the ring.

Under such circumstances, even more than in the example of FIGS. 1 and 2, the light rays penetrating into the ribs 20 are reflected by the side faces 25 of the ribs until they encounter a facet 23 which then reflects them towards the outside face 26 of the translucent part.

In one-half of the rib 20, a variant is shown in which the facets 23 are replaced by orifices 25 arranged in the thickness of the rib which is sufficient to enable each orifice to receive its own light source. In this case, the rib also guides lightwaves which are diffused through the skin.

Figure 4:
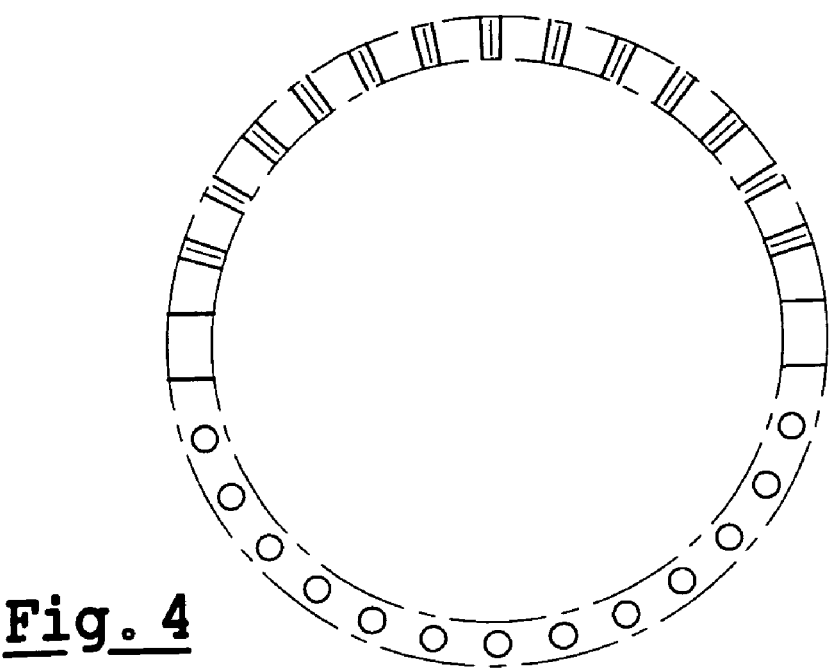
FIG. 4 shows how the FIG. 3 signaling device appears under nighttime illumination.

FIG. 4 shows an example of how the part 22 of FIG. 3 appears when lighted and seen from its outside face.

It can be seen that with only two light sources, it is possible to generate an optical signal that is very visible even though obtained extremely cheaply.

Figure 5:
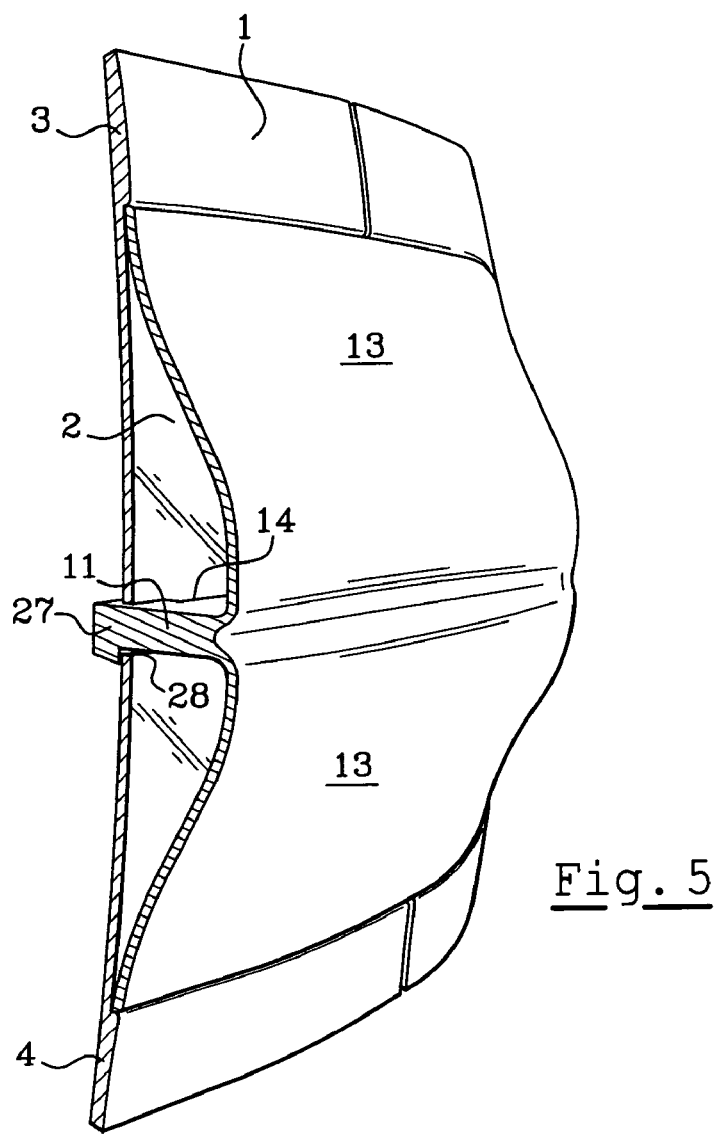
FIG. 5 is a perspective view of another embodiment of a signaling device of the invention.

In the embodiment of FIG. 5, it can be seen that the rib 11 may include means 27 for fixing it to the shield 1. These fixing means comprise, for example, clips 27 extending the face 14 of the rib 11 and designed to be snap-fastened in complementary orifices 28 arranged in the shield 1.

Figure 6:
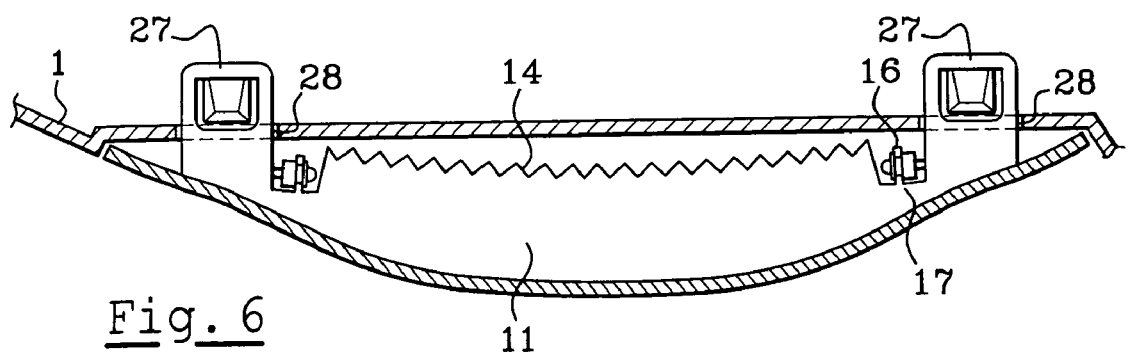
FIG. 6 is a horizontal section view of FIG. 5.

The rib 11 of the skin in FIG. 6 has two clips 27 for fixing the device to the shield 1.

In an embodiment that is not shown, the snap-fastening fixing means may extend continuously along the rib 11 so as to co-operate with a slot arranged in the shield 1.

The embodiments described above are given purely as non-limiting examples and may be modified in any desirable manner without thereby going beyond the ambit of the invention.

What is claimed is:

1. A signaling device for a motor vehicle, the signaling device comprising a skin of translucent material, the skin presenting an outside face on an exterior surface of the vehicle, and an inside face opposite from the outside face, the translucent skin including at least one rib projecting from its inside face toward an interior of the vehicle, the rib being made integrally with the skin and out of the same translucent material as the skin, said rib providing support means for protecting the skin from collapse at impact.

2. A device according to claim 1, in which the rib is shaped to reflect light rays penetrating the rib through one of its faces so that they travel towards the outside face of the skin.

3. A device according to claim 2, in which the rib includes a face opposite from the skin that is divided into facets in a staircase configuration so as to cause light rays penetrating into the rib to be reflected towards the outside face.

4. A device according to claim 1, arranged to be mounted on a bodywork part.

5. A device according to claim 4, in which the translucent skin is convex over the rib, being formed with two curved flanks that run substantially into a plane containing the face of the rib that is opposite from the skin.

6. A device according to claim 1, including means for fixing light sources to the rib.

7. A device according to claim 1, in which the rib has fixing means for co-operating with complementary means carried by a bodywork part of the vehicle.

8. A motor vehicle bodywork part designed to receive a signaling device according to claim 1, wherein an outside surface of the bodywork includes a housing for receiving the signaling device.

9. A bodywork part according to claim 8, in which the housing is recessed and presents thickness substantially equal to the thickness of the edges of the translucent skin, the outline of said housing being dimensioned in such a manner as to contain the skin exactly so that its edges lie flush with the bodywork part at the periphery of the housing.

10. A device according to claim 1, wherein the skin comprises a strip.

11. A device according to claim 1, wherein the skin comprises a bumper sticker.

12. A device according to claim 1, wherein the skin comprises a side strip for protecting a door.

* * * * *